(12) United States Patent
Cheng et al.

(10) Patent No.: US 12,483,004 B2
(45) Date of Patent: Nov. 25, 2025

(54) LASER CHIP AND PREPARATION METHOD THEREFOR

(71) Applicant: SHENZHEN RUBEUST TECHNOLOGY LIMITED, Guangdong (CN)

(72) Inventors: Chao-chen Cheng, Guangdong (CN); Xinqi Ding, Guangdong (CN); Yangfeng Wu, Guangdong (CN); Wang Jiao, Guangdong (CN); Guibo Liao, Guangdong (CN); Ju Wang, Guangdong (CN); Qingming Tu, Guangdong (CN)

(73) Assignee: SHENZHEN RUBEUST TECHNOLOGY LIMITED, Guangdong (CN)

( * ) Notice: Subject to any disclaimer, the term of this patent is extended or adjusted under 35 U.S.C. 154(b) by 530 days.

(21) Appl. No.: 17/640,815

(22) PCT Filed: Feb. 26, 2021

(86) PCT No.: PCT/CN2021/078162
§ 371 (c)(1),
(2) Date: Mar. 5, 2022

(87) PCT Pub. No.: WO2021/179917
PCT Pub. Date: Sep. 16, 2021

(65) Prior Publication Data
US 2023/0043539 A1 Feb. 9, 2023

(30) Foreign Application Priority Data
Mar. 12, 2020 (CN) .......................... 202010172742.8

(51) Int. Cl.
*H01S 5/16* (2006.01)
*H01S 5/32* (2006.01)

(52) U.S. Cl.
CPC ............ *H01S 5/162* (2013.01); *H01S 5/3211* (2013.01); *H01S 5/168* (2013.01)

(58) Field of Classification Search
CPC ................................. H01S 5/168; H01S 5/162
See application file for complete search history.

(56) References Cited

U.S. PATENT DOCUMENTS

| 5,232,867 | A | | 8/1993 | de Cremoux et al. | |
| 5,737,351 | A | * | 4/1998 | Ono | H01S 5/162 |
| | | | | | 372/46.015 |

(Continued)

FOREIGN PATENT DOCUMENTS

| CN | 102113187 A | 6/2011 |
| CN | 102891435 A | 1/2013 |

(Continued)

OTHER PUBLICATIONS

Japanese Office Action dated Jun. 25, 2024 in Japanese Patent Application No. 2022-521056.

(Continued)

*Primary Examiner* — Michael Carter
(74) *Attorney, Agent, or Firm* — Tarolli, Sundheim, Covell & Tummino LLP (57) ABSTRACT

Disclosed in the present invention are a laser chip and a preparation method therefor. Said method comprises: providing a laser epitaxial structure, the laser epitaxial structure comprising an active layer, and a cladding layer and a contact layer which are sequentially stacked on the active layer; covering a first mask layer on the contact layer, and a photolithograph step is performed on the first mask layer to form a first window region; performing primary etching on the contact layer by means of the first window region, so as to form a second window region corresponding to the first window region and exposing the cladding layer; performing zinc diffusion on the cladding layer and the active layer by (Continued)

means of the first window region and the second window region; removing the first mask layer; covering a second mask layer on the contact layer, and a photolithograph step is performed on the second mask layer to form a third window region, the projection of the third window region on the contact layer being located at the periphery of the second window region; and performing secondary etching on the contact layer by means of the third window region, so as to enlarge the second window region to correspond to the third window region. The described method can effectively increase a catastrophic optical mirror damage threshold.

8 Claims, 6 Drawing Sheets

(56) References Cited

U.S. PATENT DOCUMENTS

| | | | | |
|---|---|---|---|---|
| 2002/0098666 | A1* | 7/2002 | Sugiura | H01L 21/2258 257/E21.152 |
| 2008/0069165 | A1* | 3/2008 | Peters | H01S 5/16 372/46.01 |
| 2012/0258558 | A1* | 10/2012 | Tada | B82Y 20/00 438/42 |
| 2021/0151954 | A1* | 5/2021 | Nagano | H01S 5/0021 |
| 2022/0098666 | A1 | 3/2022 | Damsky | |

FOREIGN PATENT DOCUMENTS

| | | |
|---|---|---|
| CN | 108736316 A | 11/2018 |
| CN | 110323284 A | 10/2019 |
| JP | H05102611 A | 4/1993 |
| JP | H9139550 A | 5/1997 |
| JP | H09321388 A | 12/1997 |
| JP | H10290043 | 10/1998 |
| JP | H10290043 A | 10/1998 |
| JP | 2006108225 A | 4/2006 |
| JP | 2009170463 A | 7/2009 |
| JP | 2010278131 A | 12/2010 |
| WO | 2020022235 A1 | 1/2020 |

OTHER PUBLICATIONS

Japanese Notice of Allowance dated Aug. 23, 2024 in Japanese Patent Application No. 2022-521056.
Supplementary European Search Report dated Jan. 24, 2024 for EP Appl. No. 21768580.
International Search Report for corresponding PCT Application No. PCT/CN2021/078162, mailed May 18, 2021.
The First Examination Opinion Notification dated Mar. 29, 2025 in the corresponding Chinese Application No. 202010172742.8.

* cited by examiner

Covering the first mask layer by the zinc diffusion layer, and exposing the cladding layer through the first window region and the second window region — S141

Covering the zinc diffusion layer by a silicon oxide layer — S142

Diffusing the zinc particle of the zinc diffusion layer to the cladding layer and the active layer by heat treatment — S143

Sequentially removing the silicon oxide layer and the zinc diffusion layer — S144

LASER CHIP AND PREPARATION METHOD THEREFOR

The present application is a national stage of International Application No. PCT/CN2021/078162, filed on Feb. 26, 2021, which claims priority to Chinese Patent Application No. 202010172742.8, filed on Mar. 12, 2020, and entitled with "LASER CHIP AND PREPARATION METHOD THEREFOR". Both of the aforementioned applications are incorporated herein by reference in their entireties.

TECHNICAL FIELD

The present disclosure relates to the field of laser devices, and particularly, to a laser chip and a method for preparing the laser chip.

BACKGROUND

Increasing light output power, improving reliability and prolonging working life have always been the research focus in the field of semiconductor laser devices. Catastrophic optical mirror damage is a non-ignorable important factor to affect the maximum output power and reliability of semiconductor laser devices. Catastrophic optical mirror damage refers to a catastrophic damage in which after a cavity surface region of the laser device absorbs relatively high light radiation in the resonant cavity, the temperature at that location exceeds its melting point, and the cavity surface is melted.

The method to increase a threshold of the damage of catastrophic optical mirrors is generally to reduce the light absorption of the cavity surface. In the related art, the wide band gap materials are generally formed at adjacent region of the cavity surface by means of epitaxial re-growing, in order to further form related a transparency window for outputting light, thereby reducing the light absorption of the cavity surface. However, the epitaxial growth process is more complicated, the cost is high, and the bonding or cohesive problem of the epitaxial region may occur, thereby further affecting the device performance.

SUMMARY

The present disclosure provides a laser chip and a method for preparing the laser chip in order to solve the problem of the complicated process of improving a threshold of catastrophic optical mirror damage in the related art.

In order to solve the above technical problems, a technical solution adopted by the present disclosure is to provide a method for preparing a laser chip. The method includes: providing a laser epitaxial structure, in which the laser epitaxial structure includes an active layer, and a cladding layer and a contact layer that are sequentially stacked on the active layer; covering the contact layer with a first mask layer, and a photolithograph step is performed on the first mask layer to form a first window region; performing primary etching on the contact layer through the first window region to form a second window region corresponding to the first window region and exposing the cladding layer; performing zinc diffusion on the cladding layer and the active layer through the first window region and the second window region; removing the first mask layer; covering the contact layer with a second mask layer, and a photolithograph step is performed on the second mask layer to form a third window region, in which a projection of the third window region on the contact layer is located on the periphery of the second window region; and performing secondary etching on the contact layer through the third window region such that the second window region is expanded to correspond to the third window region.

According to an embodiment of the present disclosure, the step of performing zinc diffusion on the cladding layer and the active layer through the first window region and the second window region includes: covering the first mask layer and the cladding layer exposed through the first window region and the second window region with a zinc diffusion layer; and diffusing the zinc particle of the zinc diffusion layer to the cladding layer and the active layer by heat treatment.

According to an embodiment of the present disclosure, before diffusing the zinc particle of the zinc diffusion layer to the cladding layer and the active layer by heat treatment, the method further includes: covering the zinc diffusion layer with a silicon oxide layer.

According to an embodiment of the present disclosure, after diffusing the zinc particle of the zinc diffusion layer to the cladding layer and the active layer by heat treatment, the method further includes: sequentially removing the silicon oxide layer and the zinc diffusion layer.

According to an embodiment of the present disclosure, the treatment temperature of the heat treatment is greater than or equal to 600° C.

According to an embodiment of the present disclosure, the preparation method further includes: providing an insulation layer on the contact layer; covering the insulation layer and the contact layer by a contact metal layer; in which, the second window region is filled with the insulation layer.

According to an embodiment of the present disclosure, the primary etching is solution wet etching or mechanical dry etching.

According to an embodiment of the present disclosure, the first window region has a size ranging from 5 μm to 15 μm.

In order to solve the above technical problems, another technical solution adopted by the present disclosure is to provide a laser chip. The laser chip includes a laser epitaxial structure. The laser epitaxial structure includes an active layer, and a cladding layer and a contact layer that are sequentially stacked on the active layer, a window region exposing the cladding layer is formed on the contact layer, a zinc diffusion region is formed in the active layer and the cladding layer, and a projection of the window region on the cladding layer is located in the periphery of the zinc diffusion region and is spaced apart from the zinc diffusion zone by a certain distance.

According to an embodiment of the present disclosure, the laser chip further includes an insulation layer and a contact metal layer that are sequentially stacked on the contact layer, in which the window region is filled with the insulation layer.

Advantageous Effects

Compared with the related art, in the present disclosure, firstly, the first mask layer covers the contact layer, and the first mask layer is windowed to form the first window region, and then the contact layer is etched to form the second window region according to the first window region, exposing the cladding layer. Subsequently, the zinc diffusion layer can be covered, and the zinc diffusion can be realized by heat treatment, such that the zinc diffusion region is formed on the cladding layer and the active layer. Therefore, quantum well component atoms in the local cavity surface can be effectively diffused to each other, the band gap width of the local cavity surface can be increased, the light absorption of the local cavity surface can be reduced, thereby increasing the threshold of catastrophic optical mirror damage, and further improving the lifetime and quality of the entire laser chip. On the one hand, compared with direct diffusion in the laser epitaxial structure, in the present disclosure, performing a photolithograph step to form a window region can make the zinc diffusion layer closer to the quantum well, such that the diffusion efficiency can be improved, the laser chip can be prevented from doping in other layers of the laser chip caused by excessive long heat treatment time, thereby not negatively affecting other layers of the laser chip. On the other hand, first the first mask layer covers the contact layer, instead of performing a photolithograph step to form a window region on the contact layer and then covering the first mask layer, such that the first mask layer can be prevented from cracking due to thermal stress of the high and low levels (a part of the first mask layer is located in the window region of the contact layer, a part of the first mask layer is located on the contact layer) in the heat treatment environment, further solving the failure of the first mask layer caused by cracking of the first mask layer.

DESCRIPTION OF EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

In addition, if there are expressions such as "first", "second", and the like in the embodiments of the present disclosure, the expressions such as "first", "second", and the like are only used for descriptive purposes, and cannot be understood as indications or implications of its relative importance or implicitly indication of the number of technical features indicated. Therefore, the features defined with "first" and "second" may explicitly or implicitly include at least one of the features. In addition, the technical solutions of the various embodiments can be combined with each other, but they can be achieved by those skilled in the art. When the combination of technical solutions is contradictory or cannot be achieved, it should be considered that such a combination of technical solutions does not exist and is not within the protection scope of the present disclosure.

Figure 1:
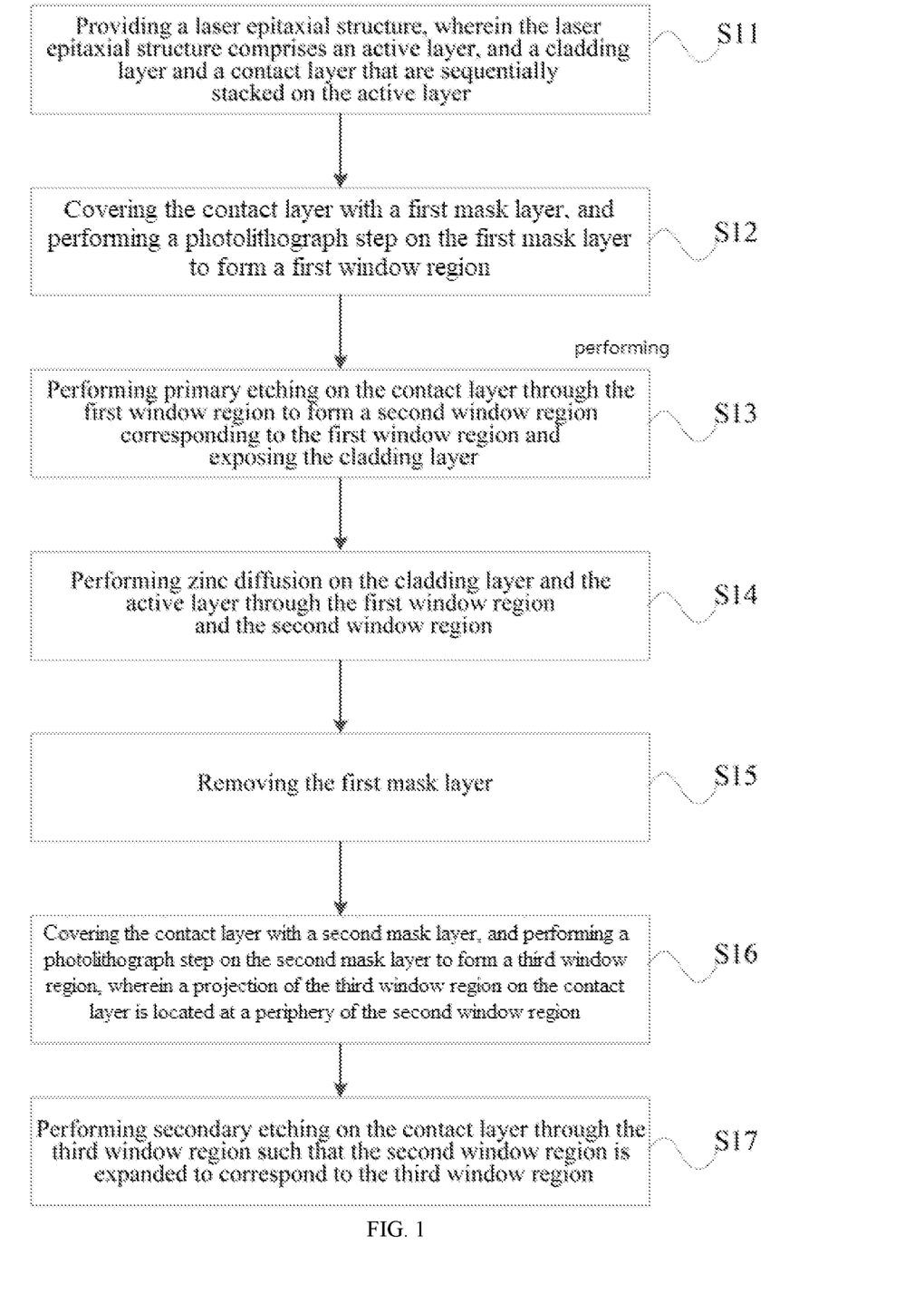
FIG. 1 is a flowchart of a method for preparing a laser chip according to Embodiment 1 of the present disclosure.

As shown in FIG. 1, FIG. 1 is a flowchart of a method for preparing a laser chip according to Embodiment 1 of the present disclosure, which specifically includes the following steps.

In S11, a laser epitaxial structure is provided. The laser epitaxial structure includes an active layer, and a cladding layer and a contact layer that are sequentially stacked on the active layer.

Figure 2:
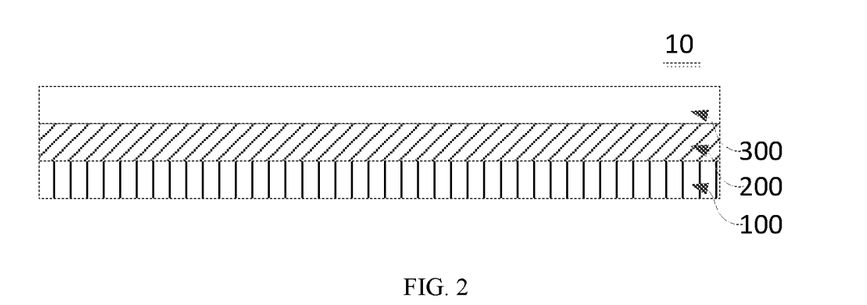
FIG. 2 is a structural schematic diagram of the laser epitaxial structure shown in FIG. 1 according to an embodiment of the present disclosure.

As shown in FIG. 2, a laser epitaxial structure 10 is provided. The laser epitaxial structure 10 includes an active layer 100, a cladding layer 200 and a contact layer 300. The cladding layer 200 and the contact layer 300 are sequentially stacked on the active layer 100.

In S12, a first mask layer is covered on the contact layer. The photolithograph step is performed on the first mask layer to form a first window region.

Figure 3:
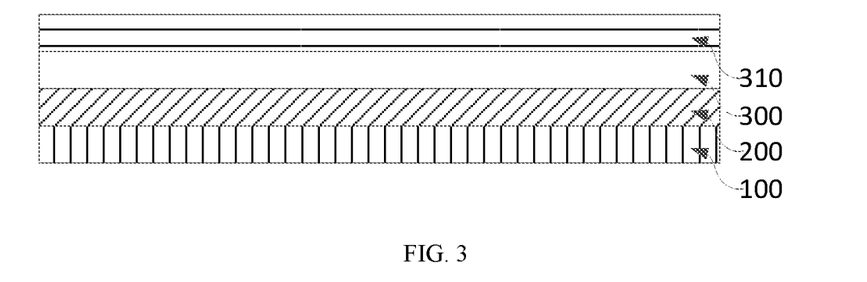
FIG. 3 is a structural schematic diagram of the laser epitaxial structure shown in FIG. 1 according to another embodiment of the present disclosure.
Figure 4:
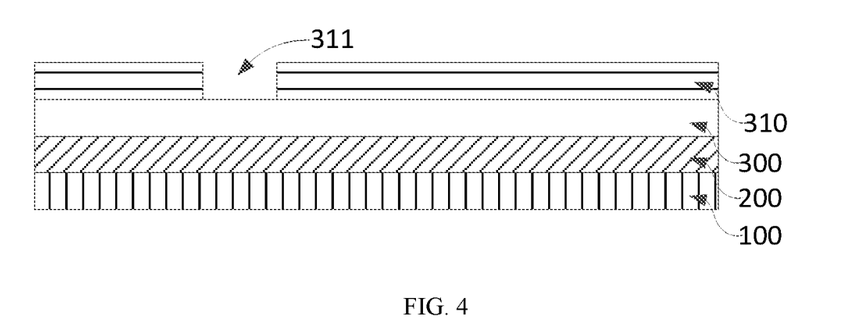
FIG. 4 is a structural schematic diagram of the laser epitaxial structure shown in FIG. 1 according to another embodiment of the present disclosure.

As shown in FIG. 3 and FIG. 4, a first mask layer 310 is covered on the contact layer 300. The photolithograph step is performed on the first mask layer 310 to form a first window region 311 on the first mask layer 310. The contact layer 300 can be exposed through the first window region 311.

Optionally, the first mask layer 310 can be made of SiNx material.

Optionally, the size of the first window region 311 can be preset according to the size of the resonant cavity, and can be ranging from 5 μm to 15 μm, e.g., 5 μm, 10 μm or 15 μm.

In S13, primary etching is performed on the contact layer through the first window region to form a second window region corresponding to the first window region and exposing the cladding layer.

Figure 5:
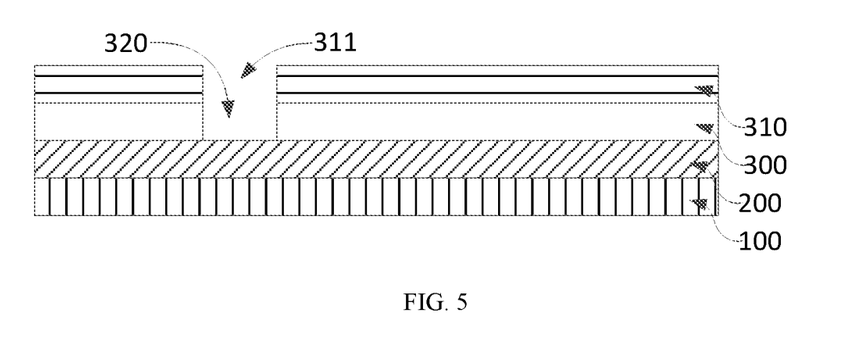
FIG. 5 is a structural schematic diagram of the laser epitaxial structure shown in FIG. 1 according to another embodiment of the present disclosure.

As shown in FIG. 5, primary etching is performed on the contact layer 300 through the first window region 311, such that a second window region 320 can be formed on the contact layer 300, and the cladding layer 200 can be exposed through the second window region 320.

The second window region 320 corresponds to the first window region 311 and has the same size as the first window region 311, that is, the projection of the first window region 311 on the cladding layer 200 overlaps with the projection of the second window region 320 on the cladding layer 200.

Optionally, the primary etching can be wet etching or cutting. Since the composition of the contact layer 300 is different from that of the cladding layer 200, the contact layer 300 can be etched with a solution with a preset ratio without affecting the cladding layer 200, or the contact layer 300 can be cut with an etching knife according to the thickness of the contact layer 300.

In S14, zinc diffusion is performed on the cladding layer and the active layer through the first window region and the second window region.

Zinc diffusion is performed on the cladding layer 200 and the active layer 100 through the first window region 311 and the second window region 320.

Figure 6:
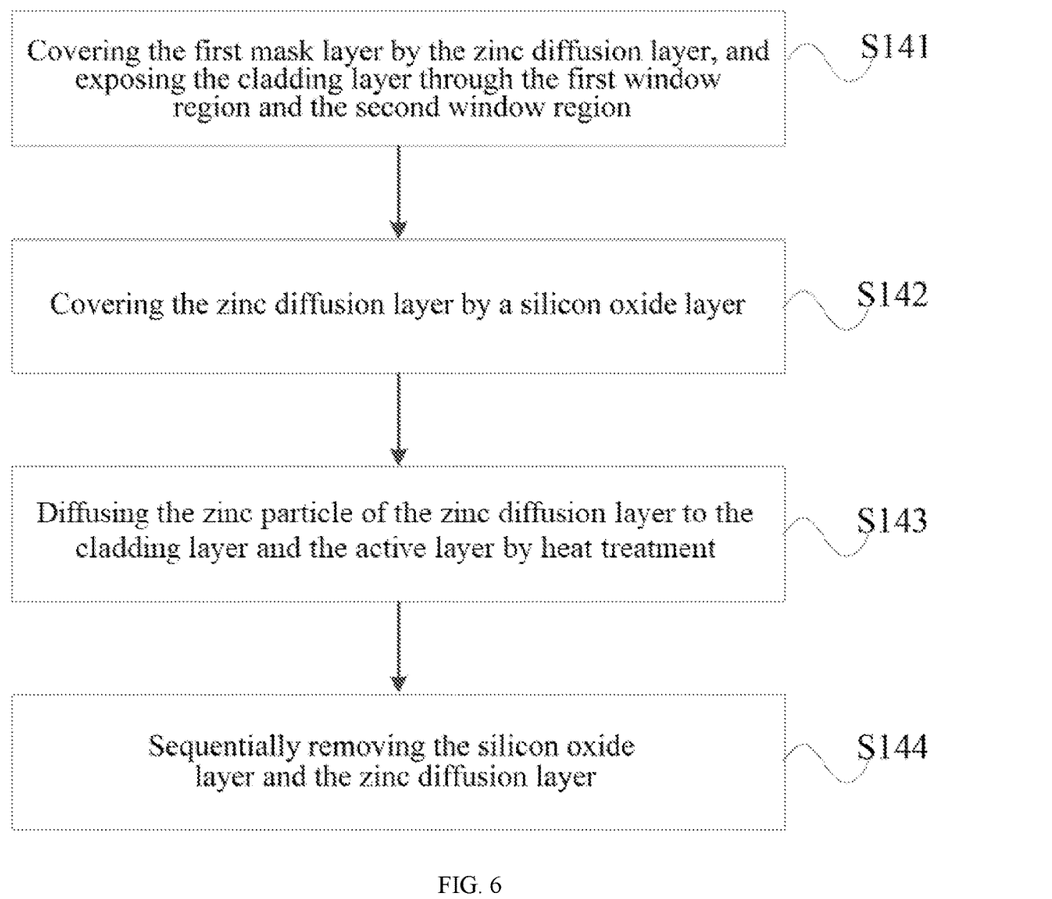
FIG. 6 is a flowchart of sub-steps of step S14 shown in FIG. 1 according to an embodiment of the present disclosure.

Referring to FIG. 6, FIG. 6 shows sub-steps of the step S14 of FIG. 1, which includes the following steps.

In S141, the first mask layer and the cladding layer exposed through the first window region and the second window region are covered by the zinc diffusion layer.

Figure 7:
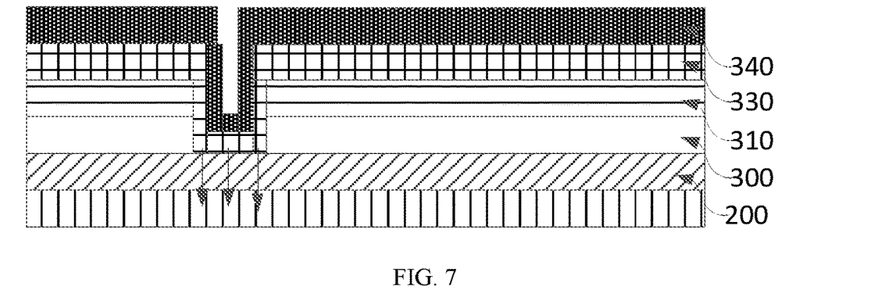
FIG. 7 is a structural schematic diagram of the laser epitaxial structure shown in FIG. 1 according to another embodiment of the present disclosure.

As shown in FIG. 7, the first mask layer 310 and the cladding layer 200 exposed through the first window region 311 and the second window region 320 are covered by the zinc diffusion layer 330.

Optionally, the zinc diffusion layer 330 can be $ZnO:SiO_2$, and the zinc diffusion layer 330 can be formed on the first mask layer 310 and the exposed cladding layer 200 by means of sputtering.

In S142, a silicon oxide layer is covered on the zinc diffusion layer.

In an alternative embodiment, a silicon oxide layer 340 can be further covered on the zinc diffusion layer 330. By further covering the silicon oxide layer 340, the zinc diffusion layer 330 and the cladding layer 200 can have a better bonding effect, thereby enhancing the zinc diffusion effect.

In S143, the zinc particle of the zinc diffusion layer is diffused to the cladding layer and the active layer by heat treatment.

The zinc particle of the zinc diffusion layer 330 can be diffused to the cladding layer 200 and the active layer 100 by heat treatment.

Figure 8:
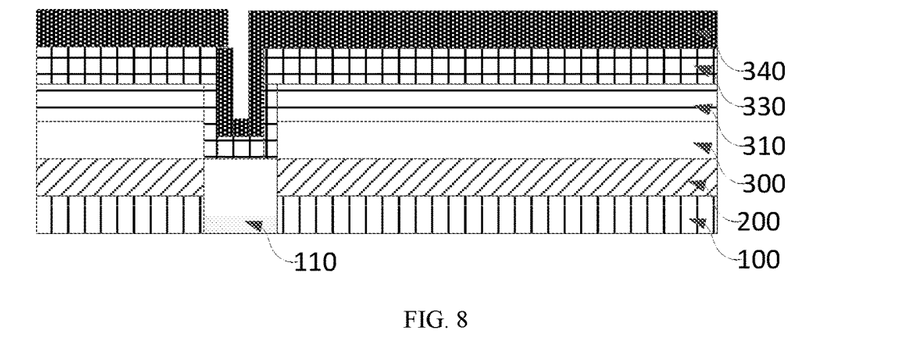
FIG. 8 is a structural schematic diagram of the laser epitaxial structure shown in FIG. 1 according to another embodiment of the present disclosure.

As shown in FIG. 7 and FIG. 8, in the heat treatment environment, the zinc particle of the zinc diffusion layer 330 begins to diffuse to the cladding layer 200, and further diffuses to the active layer 100, thereby realizing the atom diffusion of the cladding layer 200 and the active layer 100, and a zinc diffusion region 110 is formed in the cladding layer 200 and the active layer 100.

Optionally, since each layer of the laser epitaxial structure 10 is metastable, and zinc atoms have strong diffusibility, zinc diffusion is performed on the cladding layer 200 and the active layer 100, such that quantum well component atoms in the local cavity surface of the laser epitaxial structure 10 can diffuse each other, the band gap width of the local cavity surface can be increased, the light absorption of the local cavity surface can be reduced, thereby increasing the threshold of catastrophic optical mirror damage, and further improving the lifetime and quality of the entire laser chip.

Optionally, the temperature of the heat treatment can be greater than or equal to 600° C.

In step S141 of the foregoing embodiment, since not only the zinc diffusion layer 330 is covered on the cladding layer 200 exposed in the first window region 311 and the second window region 320, but also the zinc diffusion layer 330 is further covered on the first mask layer 310, in the subsequent zinc diffusion process, the zinc diffusion layer 330 located on the first mask layer 310 can continuously provide zinc atoms to zinc diffusion layer 330 located in the first window region 311 and the second window region 320, such that the zinc atom concentration of the cladding layer 200 can be maintained at a relatively high level, thereby improving the entire zinc diffusion effect.

In S144, the silicon oxide layer and the zinc diffusion layer are sequentially removed.

After the zinc diffusion is completed, the silicon oxide layer 340 and the zinc diffusion layer 330 can be sequentially removed.

In the above embodiments, firstly, the first mask layer 310 covers the contact layer 300, and a photolithograph step is performed on the first mask layer 310 to form the first window region 311, and then the contact layer 300 is etched to form the second window region 320 according to the first window region 311, exposing the cladding layer 200. Subsequently, the zinc diffusion layer 330 can be covered, and the zinc diffusion can be realized by heat treatment, such that the zinc diffusion region 110 is formed on the cladding layer 200 and the active layer 100. Therefore, quantum well component atoms in the local cavity surface can be effectively diffused to each other, the band gap width of the local cavity surface can be increased, the light absorption of the local cavity surface can be reduced, thereby increasing the threshold of catastrophic optical mirror damage, and further improving the lifetime and quality of the entire laser chip. On the one hand, compared with direct diffusion in the laser epitaxial structure 10, in the present disclosure, performing a photolithograph step on the first mask layer to form a first window region can make the zinc diffusion layer 330 closer to the quantum well, such that the diffusion efficiency can be improved, the laser chip can be prevented from doping in other layers of the laser chip caused by excessive long heat treatment time, thereby not negatively affecting other layers of the laser chip. On the other hand, firstly, the first mask layer 310 covers the contact layer 300, instead of performing a photolithograph step to form a window region on the contact layer 300 and then covering the first mask layer 310, such that the first mask layer 310 can be prevented from cracking due to thermal stress of the high and low levels (a part of the first mask layer 310 is located in the window region of the contact layer 300, a part of the first mask layer 310 is located on the contact layer 300) in the heat treatment environment, further solving the failure of the first mask layer 310 caused by cracking of the first mask layer 310.

In S15, a first mask layer is removed.

After the zinc diffusion is completed, a first mask layer 310 can be removed.

In S16, a second mask layer is covered on the contact layer, and is windowed to form a third window region. The projection of the third window region on the contact layer is located at the periphery of the second window region.

Figure 9:
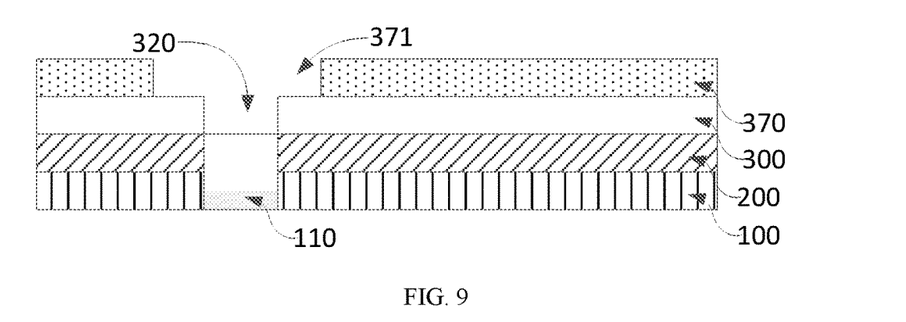
FIG. 9 is a structural schematic diagram of the laser epitaxial structure shown in FIG. 1 according to another embodiment of the present disclosure.

As shown in FIG. 9, after the first mask layer 310 is removed, a second mask layer 370 can be covered on the contact layer 300. The photolithograph step is performed on the second mask layer 370 to form a third window region 371. The projection of the third window region 371 on the contact layer 300 is located at the periphery of the second window region 320. That is, the projection of the second window region 320 on the contact layer 300 is located in the inner peripheral region of the projection of the third window region 371 on the contact layer 300.

Optionally, the second mask layer 370 can be a photolithography mask.

In S17, a secondary etching is performed on the contact layer through the third window region such that the second window region is expanded to correspond to the third window region.

Figure 10:
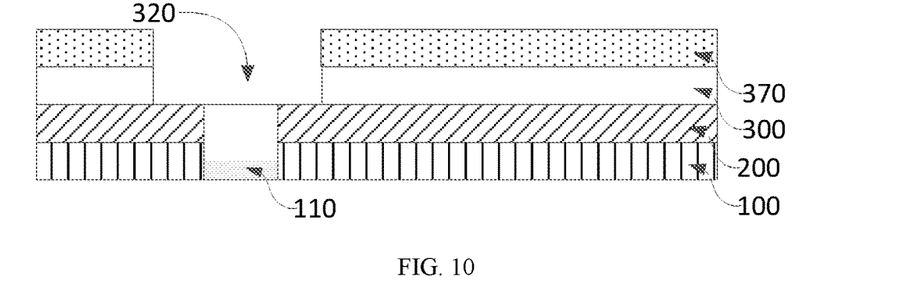
FIG. 10 is a structural schematic diagram of the laser epitaxial structure shown in FIG. 1 according to another embodiment of the present disclosure.
Figure 11:
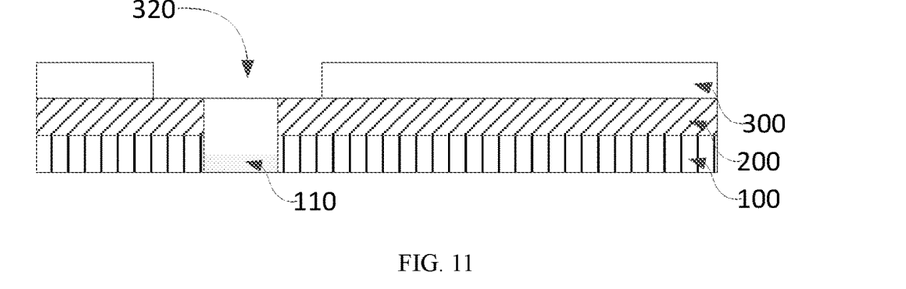
FIG. 11 is a schematic structural view of the laser epitaxial structure shown in FIG. 1 according to another embodiment of the present disclosure.

As shown in FIG. 10 and FIG. 11, a secondary etching is performed on the contact layer 300 through the third window region 371, such that the second window region 320 is expanded to correspond to the third window region 371. Optionally, the contact layer 300 can be wet-etched with a solution having another preset ratio.

After the etching is completed, the second mask layer 370 can be removed.

In the above embodiments, the second mask layer 370 is covered on the contact layer 300, the second mask layer 370 is windowed on the basis of the second window region 320, and the contact layer 300 is etched to expand the window region 320 so as to define the zinc diffusion region. Compared with some existed zinc diffusion achieved by ion injection or other manners, in the present disclosure, there is no need to relocate the zinc diffusion region, and the zinc diffusion region can be directly used as a region of the laser resonant cavity, such that the process can be effectively simplified, thereby reducing the preparation cost.

In summary, in the present disclosure, firstly, the first mask layer 310 covers the contact layer 300, and the first mask layer 310 is windowed to form the first window region 311, and then the contact layer 300 is etched to form the second window region 320 according to the first window region 311, exposing the cladding layer 200. Subsequently, the zinc diffusion layer 330 can be covered, and the zinc diffusion can be realized by heat treatment, such that the zinc diffusion region 110 is formed on the cladding layer 200 and the active layer 100. Therefore, quantum well component atoms in the local cavity surface can be effectively diffused to each other, the band gap width of the local cavity surface can be increased, the light absorption of the local cavity surface can be reduced, thereby increasing the threshold of catastrophic optical mirror damage, and further improving the lifetime and quality of the entire laser chip. Furthermore, the second mask layer 370 is covered on the contact layer 300, the second mask layer 370 is windowed on the basis of the second window region 320, and the contact layer 300 is etched to expand the window region 320, such that the zinc diffusion region can be directly positioned. Compared with some existed zinc diffusion achieved by ion injection or other manners, in the present disclosure, there is no need to relocate the zinc diffusion region, and the zinc diffusion region can be directly used as a region of the laser resonant cavity, such that the process can be effectively simplified, thereby reducing the preparation cost.

Figure 12:
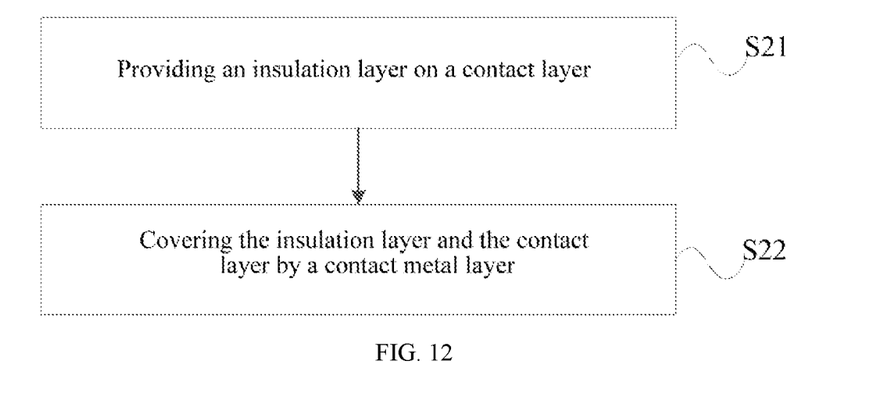
FIG. 12 is a flowchart of a method for preparing a laser chip according to Embodiment 2 of the present disclosure.

As shown in FIG. 12, FIG. 12 is a flowchart of a method for preparing a laser chip according to Embodiment 2 of the present disclosure. The method includes the following steps.

In S21, an insulation layer is provided on a contact layer.

Figure 13:
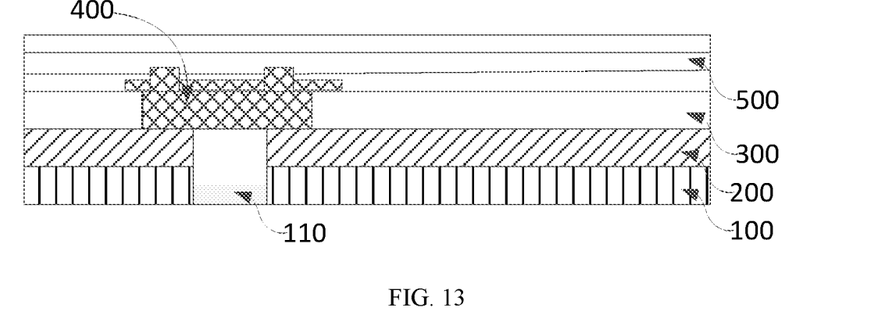
FIG. 13 is a structural schematic diagram of the laser epitaxial structure shown in FIG. 1 according to another embodiment of the present disclosure.

As shown in FIG. 13, an insulation layer 400 is further provided on a contact layer 300. A second window region 320 is filled with the insulation layer 400. Optionally, the projection of the insulation layer 400 on the contact layer 300 is located at the periphery of the second window region 320.

As shown in FIG. 13, the insulation layer 400 is mainly provided around the second window region 320 and does not completely cover the entire contact layer 300.

In S22, the insulation layer and the contact layer are covered by a contact metal layer.

Subsequently, a contact metal layer 500 is further covered on the insulation layer 400 and the contact layer 300.

In the foregoing embodiment, the insulation layer 400 is further provided on the contact layer 300, and the contact metal layer 500 covers on the insulation layer 400 and the contact layer 300, thereby completing the preparation of the laser chip.

Figure 14:
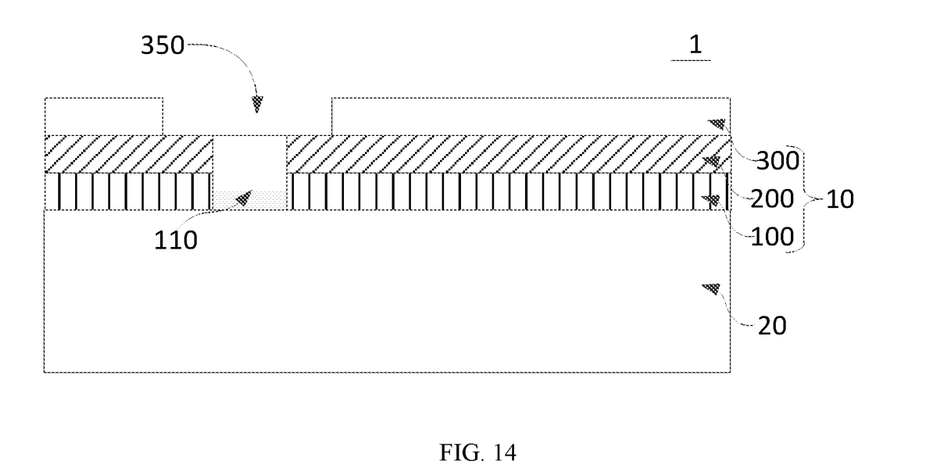
FIG. 14 is a structural schematic diagram of a laser chip according to an embodiment of the present disclosure.

As shown in FIG. 14, the present disclosure also provides a laser chip 1. The laser chip 1 includes a substrate 20 and a laser epitaxial structure 10 provided on the substrate 20. The laser epitaxial structure 10 includes an active layer 100, and a cladding layer 200 and a contact layer 300 that are sequentially stacked on the active layer 100. A window region 350 exposing the cladding layer 200 is formed on the contact layer 300. A zinc diffusion region 110 is formed within the active layer 100 and the cladding layer 200. The projection of the window region 350 on the cladding layer 200 is located at the periphery of the zinc diffusion region 110 and is spaced apart from the zinc diffusion region 110 by a certain distance.

Figure 15:
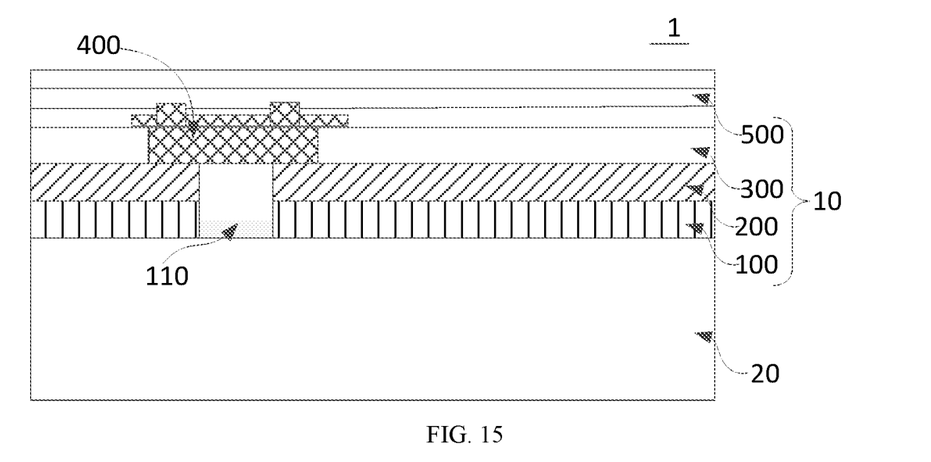
FIG. 15 is a structural schematic diagram of a laser chip according to another embodiment of the present disclosure.

As shown in FIG. 15, the laser chip 1 further includes an insulation layer 400 and a contact metal layer 500 that are sequentially stacked on the contact layer 300. A window region 350 is filled with the insulation layer 400.

The above are merely some embodiments of the present disclosure, which, as mentioned above, are not intended to limit the present disclosure. Any equivalent structure or equivalent process transformation made by using the content of the description and drawings of the present disclosure which are directly or indirectly applied to other related art shall fall into the protection scope of the present disclosure.

What is claimed is:

1. A method for preparing a laser chip, comprising:
   providing a laser epitaxial structure, wherein the laser epitaxial structure comprises an active layer, and a cladding layer and a contact layer that are sequentially stacked on the active layer;
   covering the contact layer with a first mask layer, and performing a photolithograph step on the first mask layer to form a first window region;
   performing a primary etching on the contact layer through the first window region to form a second window region which corresponds to the first window region and exposes the cladding layer;
   performing zinc diffusion on the cladding layer and the active layer through the first window region and the second window region;
   removing the first mask layer;
   covering the contact layer with a second mask layer, and performing a photolithograph step on the second mask layer on a basis of the second window region to form a third window region, wherein a projection of the third window region on the contact layer is located at a periphery of the second window region; and
   performing a secondary etching on the contact layer through the third window region, such that the second window region is expanded to correspond to the third window region.

2. The method according to claim 1, wherein
   said performing zinc diffusion on the cladding layer and the active layer through the first window region and the second window region comprises:
   covering the first mask layer and the cladding layer exposed through the first window region and the second window region with a zinc diffusion layer; and
   diffusing zinc particle of the zinc diffusion layer to the cladding layer and the active layer by heat treatment.

3. The method according to claim 2, wherein
before diffusing zinc particle of the zinc diffusion layer to the cladding layer and the active layer by heat treatment, the method further comprises:
covering the zinc diffusion layer with a silicon oxide layer.

4. The method according to claim 3, where
after diffusing zinc particle of the zinc diffusion layer to the cladding layer and the active layer by heat treatment, the method further comprises:
sequentially removing the silicon oxide layer and the zinc diffusion layer.

5. The method according to claim 2, wherein a treatment temperature of the heat treatment is greater than or equal to 600° C.

6. The method according to claim 1, further comprising:
providing an insulation layer on the contact layer; and
covering the insulation layer and the contact layer by a contact metal layer;
wherein the second window region is filled with the insulation layer.

7. The method according to claim 1, wherein the primary etching is a solution wet etching or a mechanical dry etching.

8. The method according to claim 1, wherein the first window region has a size ranging from 5 μm to 15 μm.

* * * * *